E. W. ROBERTS

VALVE ASSEMBLY

April 19, 1932. Re. 18,430

Original Filed Nov. 19, 1928

INVENTOR

Earl W. Roberts

BY

Whittemore, Hulbert & Whittemore, Belknap

ATTORNEYS

Reissued Apr. 19, 1932

Re. 18,430

UNITED STATES PATENT OFFICE

EARL W. ROBERTS, OF DETROIT, MICHIGAN, ASSIGNOR TO ROBERTS BRASS MANUFACTURING COMPANY, OF DETROIT, MICHIGAN, A CORPORATION OF MICHIGAN

VALVE ASSEMBLY

Original No. 1,838,870, dated December 29, 1931, Serial No. 320,477, filed November 19, 1928. Application for reissue filed February 12, 1932. Serial No. 593,934.

This invention relates generally to valve assemblies, especially gas cocks of the rotary plug type and consists of certain novel features of construction, combinations and arrangements of parts that will be hereinafter more fully described and particularly pointed out in the appended claims.

Heretofore the rotary plugs of gas cocks have been provided intermediate of their ends with transversely extending bores or passages that registered with similar inlet and outlet ports or passages at diametrically opposite sides of the plug casings, and the flow of the gas from the inlet passage to the outlet passage was regulated solely by the position of the plug passage with respect to said inlet and said outlet passages. When a low flame was desired the plug had to be rotated blindly to the proper point. In use it frequently happened that the plug was turned too far toward closed position and consequently the light went out. Moreover it was difficult to remember the proper point to which the plug should be rotated to obtain the desired low flame. Oftentimes the same or proper point was not reached and flames of irregular depth and size were consequently obtained.

With the present invention, however, the objectionable features just mentioned have been obviated. With my construction a high flame and a low flame is obtained by the rotation of the plug, and the low flame is always uniform. The change from high to low or vice versa may be easily and quickly accomplished, in fact an eighth of a turn of the plug will reduce the flame to any desired point. Moreover the size of the low flame may be varied by means of a suitable regulating needle on the plug casing. Thus my valve assembly possesses exceptional utility, especially when used in connection with solid top ranges where the flame is hidden from view.

Figure 1:
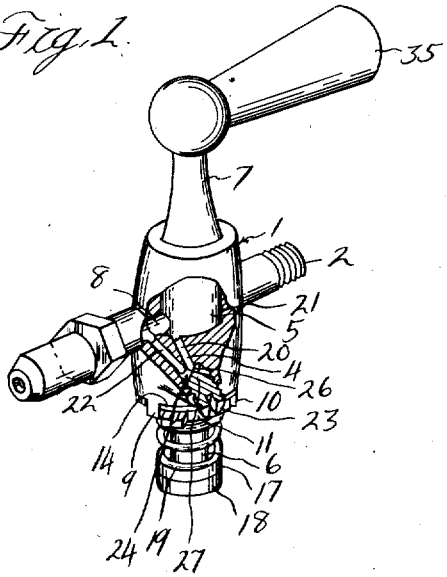
Figure 1 is a perspective view of a valve assembly embodying my invention with portions of the valve casing broken away and showing the transverse passage in the plug registering with the inlet and outlet ports in the casing.
Figure 2:
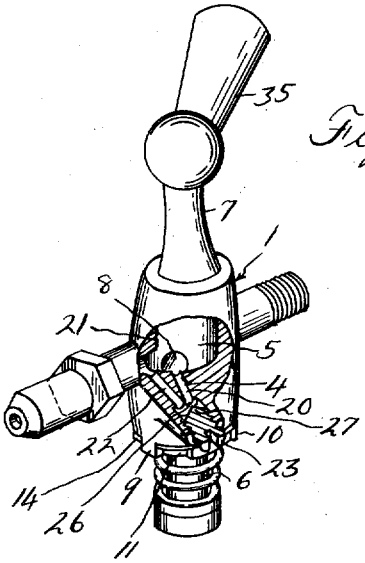
Figure 2 is a view similar to Figure 1 but showing the transverse passage in the plug registering with the inlet port and by-pass.

Referring now to the drawings, 1 is a valve casing having laterally opening inlet and outlet ports 2 and 3 respectively and an intermediate restricted by-pass 4; 5 is a rotary plug in the casing 1 and having stem extensions 6 and 7 at its opposite ends projecting above and below the valve casing, and having a transverse passage or bore 8 intermediate of its ends adapted to register with the inlet and outlet ports 2 and 3 in the valve casing; 9 and 10 are integral lugs projecting downwardly from the lower end of the casing 1 at diametrically opposite points thereof; 11 is a stop washer non-rotatably sleeved on the stem 6 and having segmental recesses 12 and 13 at diametrically opposite points thereof receiving the lugs 9 and 10 whereby engagement of the ends of the recesses 12 and 13 with the lugs 9 and 10 will limit the rotative movement of the plug 5 in opposite directions and thereby cause the transverse passage 8 therein to be alternately in and out of registration with the inlet and outlet ports 2 and 3 and with the inlet port 2 and by-pass 4; 14 is a latch washer freely surrounding the stem 6 and having slots 15 and 16 at diametrically opposite points receiving the lugs 9 and 10; 17 and 18 respectively are nuts threaded upon the stem 6 at the lower end thereof, and 19 is a coil spring surrounding the stem 6 between the uppermost nut 17 and the stop washer 11 and pressing the washers 11 and 14 upwardly and retaining the same in operative position with respect to the valve casing and depending lugs 9 and 10 thereof.

Figure 3:
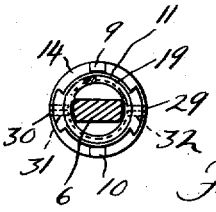
Figure 3 is a sectional view taken on the line 3—3 of Figure 6.
Figure 6:
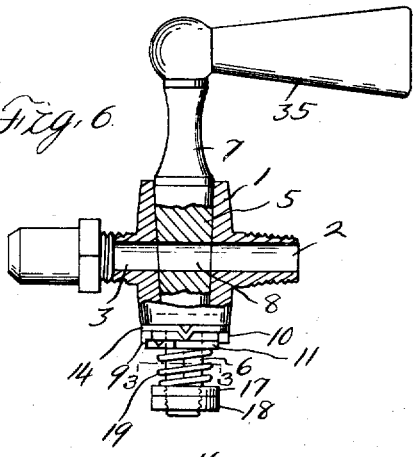
Figure 6 is a side elevation of the valve with a part thereof in section.
Figure 7:
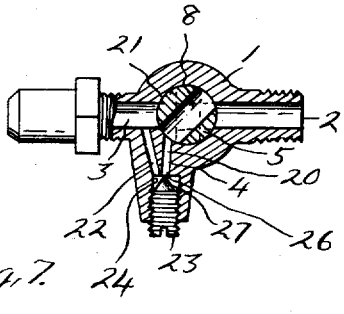
Figure 7 is a horizontal sectional view through the valve with a part in elevation.
Figure 4:
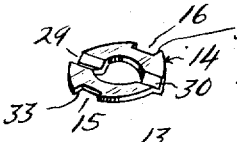
Figure 4 is a detail perspective view of the washer 14.
Figure 5:
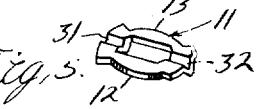
Figure 5 is a detail perspective view of the washer 11.

As shown the by-pass 4 is V-shape in form with the branch 20 thereof opening into the central longitudinal bore 21 of the valve casing for registration with the passage 8 in the plug 5 when the latter is in an intermediate position, and with the branch 22 thereof opening into the outlet port 3. Thus when the passage 8 in the plug 5 registers with the branch 20 of the by-pass 4 the fluid entering the inlet port 2 of the casing will flow through the passage 8 in the plug into the by-pass 4 and thence into the outlet port 3. When the plug is in this position direct communication between the inlet and outlet ports 2 and 3 is cut off. However the passage 8 still communicates with the inlet port 2 as clearly illustrated in Figure 3 of the accompanying drawings. Thus when the assembly is used as a gas cock, the flow of gas to the outlet port 3 may be either high or low or entirely cut off depending upon the position of the plug 5 and passage 8 therein with respect to the ports 2 and 3 and by-pass 4.

With the present construction the flow of gas thru the by-pass 4 is controlled by an adjusting needle 23 that threadedly engages the walls of the passage 24 at the apex of the V-shaped by-pass. Preferably this passage 24 is in line with the branch 20 of the by-pass so that the outer end 26 of said branch constitutes a valve seat for the pointed inner end 27 of the adjusting needle 23. Thus the passage 24 constitutes a portion of the by-pass 4 and the flow of gas thru this by-pass from the inlet branch 20 to the outlet branch 22 may be easily and quickly regulated by adjusting the needle 23 toward and away from the seat 26.

The latch washer 14 abuts the lower end of the casing 1 and is provided at diametrically opposite points thereof with depending V-shaped projections or depressed portions 29 and 30 that are engageable with correspondingly shaped recesses or grooves 31 and 32 in the upper face of the stop washer 11. Preferably these depressions 29 and 30 are in a plane at right angles to the plane of the lugs 9 and 10 and the grooves 31 and 32 are in the plane of the shoulders 33 and 34 provided by the segmental recesses 12 and 13 in the stop washer 11 so that the grooves 31 and 32 will be engaged by the depressions 29 and 30 when the passage 8 in the plug 5 registers with the inlet port 2 and by-pass 4.

In use the plug 5 may be turned freely by a suitable operating handle 35 carried by the stem 7 to fully open or closed positions yet is capable of being automatically and effectively held in the intermediate by-pass registering position by the engagement of the depressions 29 and 30 with the grooves 31 and 32. Even in fully open or closed positions the frictional engagement between the depressions 29 and 30 and the upper flat face of the stop washer 11 caused by the upward spring 19 pressure is such that the plug 5 will be effectively held in adjusted position.

Thus from the foregoing description it will be readily apparent that I have provided a very practical and useful valve assembly in which the flow of gas may be regulated to produce uniform high and low flames and in which the size or depth of the low flame may be definitely varied as desired. It will also be apparent that the arrangement of washers will effectively and accurately hold the plug in the desired position to which it is rotated.

The retaining means herein shown and described is claimed in my prior application Serial No. 320,476 filed November 19, 1928, now Patent 1,832,426.

While it is believed that from the foregoing description, the nature and advantages of the invention will be readily apparent, I desire to have it understood that I do not limit myself to what is herein shown and described and that such changes may be resorted to when desired as fall within the scope of what is claimed.

What I claim as my invention is:

1. A valve assembly including a casing having a longitudinally extending bore, transversely extending inlet and outlet passages projecting laterally from said bore, an outwardly opening socket extending transversely of the casing and a substantially V-shaped by-pass extending transversely of the casing with the apex of the V opening into the inner end of the socket and with the two branches of the V opening into the bore and outlet passage respectively, one of said branches being in alignment with the socket and disposed substantially axially thereof, and a valve adjustable in the socket in alignment with and adapted to close the last mentioned branch.

2. A valve assembly including a casing having a longitudinally extending bore, transversely extending inlet and outlet passages in communication with said bore, an outwardly opening socket extending transversely of the casing, and a substantially V-shaped by-pass extending transversely of the casing with the apex of the V opening into the inner end of the socket and with the two branches of the V in communication with the bore and outlet passage respectively, one of said branches being in alignment with the socket and disposed substantially axially thereof, and a valve adjustable in the socket in alignment with and adapted to close the last mentioned branch.

3. A valve assembly including a casting constituting a casing and having a bore for a movable valve, inlet and outlet passages in communication with said bore, and a by-pass between the bore and outlet passage including an outwardly opening socket in one side of the casting, and a substantially V-shaped passage extending inwardly from the inner end of said socket with the apex of the V opening into the inner end of the socket and with the two branches of the V in communication with the bore and outlet passage, one of said branches being in alignment with the socket and disposed substantially axially thereof, and a valve adjustable in the socket in alignment with and adapted to close the last mentioned passage.

In testimony whereof I affix my signature.

EARL W. ROBERTS.